Feb. 18, 1958 W. K. GANNETT 2,823,580
AUTOFOCUS MECHANISM
Filed July 11, 1955
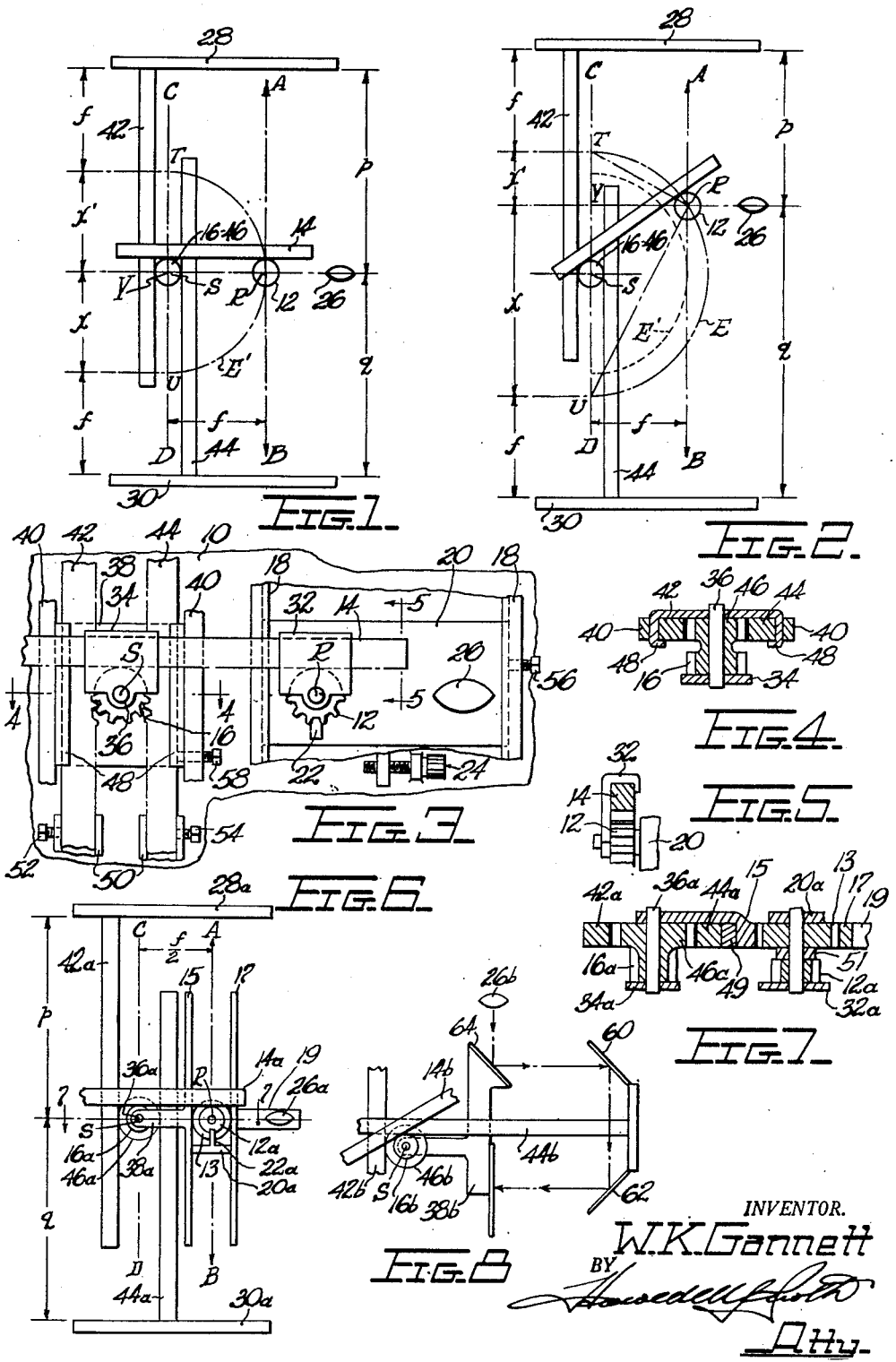
INVENTOR.
W. K. Gannett

United States Patent Office 2,823,580
Patented Feb. 18, 1958

2,823,580
AUTOFOCUS MECHANISM

Wright K. Gannett, near Davenport, Iowa

Application July 11, 1955, Serial No. 521,067

6 Claims. (Cl. 88—24)

This application is a continuation-in-part of copending application Serial No. 441,479, filed July 6, 1954, now abandoned; and the invention relates to inversor mechanism and has for its principal objects the provision of a novel type mechanism and, specifically, the utilization therefor of rack and pinion means or such equivalent thereof as employs an arcuate, non-rotatable input member movable in translation to move a meshing feed bar which in turn drives a rotatable output member through a range that is a function of movement of the feed bar, thereby serving as an inversor or computer to the output of which mechanical components can be connected for producing relative movement, for example, among the image, object and lens of photographic equipment such as cameras, projectors, enlargers, etc. In short, the novel inversor or computer is ideally suited for use, among other things, in the photogrammetric art as an autofocus. However, as will become apparent, the mechanism is suited for other situations in which comparable mathematical formulae are applicable.

The practical application of any inversor as an autofocus is based on the relationship between an image-forming optical element such as a lens or mirror and the object and image surfaces, which relationship can be expressed in the Newtonian form of the lens equation where the focal length becomes the radius of inversion; viz., $xx' = f^2$, or $x' = p - f$ and $x = q - f$, where $p$ is the lens-to-object distance and
$q$ is the lens-to-image distance (or vice versa)

By substitution:

$$(q-f)(p-f) = f^2$$

This readily converts to the better known form of the lens equation:

$$\frac{1}{p} + \frac{1}{q} = \frac{1}{f}$$

Thus, an inversor, when used as an autofocus, is a computer that solves the lens equation as applied to positive lens systems or focusing mirrors, but inversors heretofore used in autofocus mechanisms in one form or another; e. g., Pythagorean right angle, Carpentier linkage, Peaucellier cell, etc. suffer from looseness, inaccuracy where indeterminate or dead-center positions are approached, and, under certain conditions create malfunctioning because of binding or wrap-up. The well-known band inversor is a possible exception to the above in some respects, but its primary defect is that it is positive in only one direction and therefore requires a reversing bias or loading. Moreover, a band is inherently dimensionally unstable.

The present invention eliminates these and other disadvantages, because in its preferred forms, it comprises few moving parts, is dimensionally stable, is positive in both directions and all positions and may be selectively controlled without binding.

The foregoing and other important objects and desirable features, inherent in and encompassed by the invention, will become apparent as preferred embodiments thereof are disclosed in detail in the ensuing specification and accompanying drawings, the several figures of which are described immediately below.

Figure 1 is a schematic view of an overall system in a center or neutral position.

Figure 2 is a similar view but shows the system animated out of the Figure 1 position.

Figure 3 is an enlarged fragmentary view showing the computer mechanism in representative detail, together with its mechanical output connections.

Figure 4 is a section on the line 4—4 of Figure 3.

Figure 5 is a fragmentary section as seen along the line 5—5 of Figure 3.

Figure 6 is a schematic view of a modified mechanism in which part of the inversor utilizes a fractional-size similitude.

Figure 7 is an enlarged section on the line 7—7 of Figure 6.

Figure 8 is a schematic view of a further modification in which a mirror system is superimposed on a portion of the mechanism of Figure 6.

The details of the computer mechanism may be best understood from Figure 3, wherein are shown a basic support 10, an input member 12, a feed member 14 and an output member 16, together with other components establishing an operative assembly. The expressions "input" and "output" are used only in the interests of clarity and brevity, for, as will be seen below, either, as well as other components, may be selectively employed as a "driver." Likewise in the interests of clarity and brevity, the members 12 and 16 will be referred to as pinions and the feed member 14 as a rack, since racks and pinions admirably lend themselves as commercially practicable expedients; although, it is to be understood that equivalent "meshing" components could be employed. It will also be apparent that the member or pinion 12 could be a sector or other arcuate member, since the full 360° thereof is not normally used, but as a commercial proposition a pinion is suited both functionally and cost-wise.

The basic support 10 has thereon a pair of elongated guides or ways 18 which carry a movable support or carriage 20 for bi-directional linear movement along a path or line of action AB, which line is parallel to the ways and intersects a point R coincident with the center of the member or pinion 12. This pinion is movable bodily with the carriage but is fixed against rotation by a carriage-to-pinion key 22. The set of ways, and therefore the carriage 20 and the line of action AB, may be adjusted crosswise of the line of action by any suitable means such as shown, by way of example, at 24.

When the inversor, as shown here, is used as an autofocus, the carriage 20 serves to support a lens, shown typically at 26. If the lens is of the type having zero or negligible nodal separation, it may be alined with the pinion center R on a line normal to the line of action AB, or it may be offset above or below that line, but such offset must be respected in the relative locations of object and image platens or elements 28 and 30, respectively. As will readily occur to those versed in the art, the object and image may be interchanged, with corresponding reduction and enlargement, as the case may be, since the motions are symmetrical at opposite sides (here above and below) of the center position of Figure 1. Here again, the language employed is illustrative and not limiting.

The feed member or rack 14 is kept in mesh with the pinion 12 by a sleeve guide 32 (Fig. 5) which, in section, appears very much like that of a second sleeve guide 34 (Figure 4) that maintains the mesh between the rack 14 and the pinion or output member 16. The pinions 12 and 16 are of the same pitch diameter. The pinion 16 rotates about a center S afforded by a shaft 36 that is carried by another secondary support or carriage 38 which in turn is guided by ways 40 on the basic support 10 for linear movement along a line CD parallel to the line of action AB. The lines AB and CD are spaced apart a distance $f$, exactly equal to the focal length of the particular lens 26. The adjustment at 24 will compensate for lenses of the same nominal focal length but with slight differences due to manufacturing tolerances, as well as for lenses of different focal lengths. The ways 40, like the ways 18, may be as long as necessity dictates and are shown broken away to expedite the illustrations. The carriages 20 and 38 are relatively movable and either may be selected as the "driver," with any suitable means, referred to below, for holding one while the other is moved along its line of movement (AB or CD). Or both may be moved simultaneously but in opposite directions.

It will be thus apparent from the foregoing that if the carriage 38, for example, is immobilized and the carriage 20 is moved, the pinion 12, being non-rotatable, will travel along the line AB, and as the rack 14 is pulled or pushed thereby it will feed in or out to the rotatable pinion 16, causing the latter to move angularly. This angular motion is converted to linear motions in opposite directions by mechanical means such as driven members or racks 42 and 44, connected respectively to the image and object platens 28 and 30 and meshing with a driven member or pinion 46 that is preferably integral and coaxial with the pinion 16, both pinions being adequately journaled on the shaft 36. The pinions 16 and 46 have the same pitch diameters. Extensions 48 on the carriage 38 and additional ways 50 on the support 10 may be used to guide the racks 42 and 44. The overall result is that as the lens 26, which is mounted on the carriage 20, moves up (for example: Fig. 1 to Fig. 2) the object platen moves up and the image platen moves down according to the lens equation previously expressed:

$$\frac{1}{p}+\frac{1}{q}=\frac{1}{f}$$

This may be readily understood from Figs. 1 and 2, wherein the letters $p$, $q$ and $f$ are applied to the drawings, as are the letters $x$ and $x'$ from the comparable lens equation:

$$xx'=f^2$$

In addition, letters of reference and lines of construction are added (Figs. 1, 2 and 3) to explain the principle involved.

In Figure 1, the pinion centers S and R are directly opposite each other and are spaced apart a distance SR equal to the focal length $f$ of the lens 26. The pitch diameters of the pinions 12 and 16 and 46 are the same. Each of the points S and R is two focal lengths ($2f$) from the object and image platens 28 and 30; or, the platens are separated by $4f$, with the lens centered between them. It is of course, recognized that nodal separation in the lens must be added algebraically to $4f$ but it will be assumed here, for the sake of simplicity that there is no effective nodal separation. The magnification ratio is 1:1, still referring to Fig. 1.

In Figure 2, which is selected first because of its clarity, a semi-circle E is drawn about S as a center, with a radius SR and a diameter TU on the line CD. The line YR, perpendicular to TU, equals $f$. The triangle TRU, being inscribed in the semi-circle E, is a right triangle and, by trigonometry:

$$\frac{TY}{YR}=\frac{YR}{YU}$$

or $$\frac{x'}{f}=\frac{f}{x}$$

or $$xx'=f^2$$

Again by substitution:

$$x'=p-f$$

and $$x=q-f$$

The points T and U are equidistant ($f$) from their respective platens 28 and 30; and, as R travels along the line AB to the position of Figure 1, T and U remain in fixed relationship to their respective platens 28 and 30 and respective racks 42 and 44, because, as the pinion set 16—46 moves angularly (since R moves relative to S), it feeds in equal amounts on the racks 14, 42 and 44. Or, stated otherwise, the input to the pinion 16 via the rack 14 equals the output of the pinion 46 (in this instance retraction) to each rack 42 and 44, and these two racks move simultaneously and in opposite directions. When R moves from the Figure 1 position to that of Figure 2, the output to the racks 42 and 44 is in extension.

Since Figure 1 represents the dead center (or 1×1 magnification-reduction) position, $f=x=x'$ and $p=q=2f$. The points Y and S are now coincident and a new right triangle TRU can be inscribed in a smaller semicircle E' (added in dotted lines in Figure 2 for comparison with E). Again $$\frac{TY}{YR}=\frac{YR}{YU}$$

as before, but, whereas, in Figure 2, YU is greater than TY, in Figure 1, TY and YU are equal, because R, in moving from the Figure 2 position to the Figure 1 position is constrained by the ways 18 to move along the straight line AB and not along the semi-circle E. Hence, each platen will be retracted by the difference between the radii of the semicircles E and E'.

The foregoing may be further explained as follows. In either Figure 1 or Figure 2, let $x'$ represent the distance TY and $x$ represent the distance YU. Since R in either case is on a semi-circle (E in Figure 2; E' in Figure 1) of which TU is the diameter, it follows from geometry that $$xx'=f^2$$

It is also apparent, in either figure, that $$x'=p-f$$

and $$x=q-f$$

By substitution:

$$(q-f)(p-f)=f^2$$

which converts algebraically into $$\frac{1}{p}+\frac{1}{q}=\frac{1}{f}$$

the starting equation.

The foregoing explanation has proceeded on the assumption, by way of example only, that the carriage 38 and hence the point S is fixed and the carriage 20 and hence the point R is moved. However, as already indicated, the displacement of R as to S is relative and symmetrical. That is, the carriage 20 could be fixed and the carriage 38 could be moved. Also, either of the platens 28 and 30 could receive the initiating force, with the other platen held and S and R free to move. In short, any one of the four elements 28, 30, S and R could serve as the motivating element, with one of the remaining three fixed or held and both of the last remaining two free. As a matter of commercial practicability and to eliminate binding entirely, the choice of the motivating element should be made selective and alternative so that the user can easily and readily change from one to the other. Means for holding one element while permitting movement of the other three could take any suitable forms that will readily suggest themselves on the basis of the schematically illustrated brakes 52, 54, 56 and 58 for the rack 42, rack 44, carriage 20 and carriage 38, respectively. Although the selected motivating element or member is movable by hand, any motive force could be employed.

In the modified system shown in Figures 6 and 7, consideration has been given to the desirability of modifying the lateral dimension of the arrangement, which is normally governed by the length of the rack 14. This rack may be lengthened or shortened on the basis of a difference in the distance between lines AB and CD, which may be any fraction or multiple of the focal length $f$, provided that adequate compensation is made for that change. Normally, one would prefer a smaller lateral dimension and accordingly, for convenience, the distance between lines AB and CD has been illustrated in Figures 6 and 7 as $f/2$. The scale of $f/2$ in Figures 6 and 7 has been somewhat enlarged over what it would be on the basis of $f$ in Figures 1-5, but this liberty is taken in the interests of more clearly illustrating the added racks, etc. To the extent that the components of Figures 6 and 7 are the same as those of Figures 1-5, they are repeated and are identified by reference numerals supplemented by the letter "a." New or added elements are independently designated.

To that end then, the system of Figures 6 and 7 includes a pinion member 12a (which could be a sector or its equivalent as discussed above with respect to member 12) carried by a carriage 20a which is suitably guided for movement along the line of action AB. The ways 18 of Figures 1-5 could be used as guides. A key 22a locks the pinion 12a against rotation. A rack 14a meshes with the pinion 12a and also meshes with a pinion 16a of the same pitch diameter as the pinion 12a. Means 32a and 34a, such as the sleeves 32 and 34, respectively, as previously described, may be used to retain the rack-to-pinions relationship. A carriage 38a, supported on a basic support like 10, as is the carriage 20a, has a shaft 36a on which the pinion 16a is journaled. The line CD, along which the carriage 38a is selectively movable, is in this case spaced from line AB by a distance $f/2$; although any suitable fraction or multiple of $f$ could be used. For present purposes, the fraction $f/2$ will be adopted.

On that premise, if racks 42a and 44a, connected respectively to platens 28a and 30a, were meshed with a coaxial pinion fixed to and having the same size as the pinion 16a, movement of the platens would be less than required. Hence, a larger pinion 46a must be keyed to or rigid with the pinion 16a, and this larger pinion meshes with the racks 42a and 44a. The pitch diameter of the pinion 46a, on the basis of $f/2$ must therefore be twice that of the pinion 16a to give the racks 42a and 44a the required travel. The carriage 38a is extended laterally past the rack 44a for rigid connection to an added rack 15 which meshes with a pinion 13 coaxial with but journaled relative to the pinion 12a and separated therefrom by a spacer 51. The pitch diameter of the pinion 13 is immaterial. A second added rack 17, parallel to the rack 15, meshes with the pinion 13 and has a lens support 19 which carries a lens 26a. In other words, the lens 26a is not directly mounted on the pinion carriage 20a like 26 and 20 in Figures 1-5 but instead is connected to the carriage 20a via the rack 17 and pinion 13. This difference is due to the $f/2$ spacing between lines AB and CD and the corresponding inverse ratio between the pinions 16a and 46a.

In operation, let it be assumed that the rack 15 is held by any suitable means (such as suggested above for Figures 1-5) and that the other racks and the carriage 20a are free to move along their guided paths. In this respect, the racks 42a, 44a, 15 and 17 may be guided as in Figures 1-5, and, because of the proximity of the racks 44a and 15, an interposed guide or way 49 could be used. Now, assume that the carriage 20a (mounting the pinion 12a and hence the point R) is moved upwardly along AB. With the rack 15 fixed, pinion 13 rolls along that rack but propels the lens-carrying rack 17 twice the distance that R travels. As R moves, the rack 14a feeds to the pinion 16a and the pinion 46a (rigid with 16a) doubles the output to the racks 42a and 44a, thus keeping the required relationship. As before, one of the other members could be held while the remainder are movable.

It will be apparent that the use of other fractions or multiples of $f$ will require appropriate adjustment of the ratios of the pinions and racks to each other, all of which is demonstrated by the above example.

Figure 8 illustrates another modified system in which it will be assumed that a pinion 46b, while rotatable, is fixed to a suitable support 38b, and an image platen 30b is likewise fixed to 38b at right angles to an object platen (not shown, but imported from Figure 6, for example). The light path from a lens 26b, supported like the lens 26a, is turned by a series of mirrors 64, 60 and 62. The mirror 64 is angled at 45° to the light path from the lens 26b and is suitably fixed as to the support 38b. The mirrors 60 and 62 are fixed to a movable mirror-carriage rack 44b which meshes along its bottom edge with a pinion 16b. This pinion is fed by a meshing rack 14b as by the pinion 12a of Figure 6. The pinion 16b is axially wide enough to accommodate both racks 14b and 44b. The object platen is carried by an upright rack 42b which meshes with a pinion 46b coaxial with and keyed or otherwise secured to the pinion 16b. The pitch diameter of the pinion 46b is twice that of the pinion 16b. In short, the parts 14b, 16b, 42b and 46b are respectively like 14a, 16a, 42a and 46a of Figure 6. But the rack 44b meshes not with the pinion 46b but with the pinion 16b. Hence, the travel of the rack 44b is one-half that of the rack 42b, because of the 2:1 ratio of 46b to 16b. But the difference is compensated for by the doubling effect of the mirror series 64, 60 and 62. As the lens 26b is moved upwardly, for example, as by the mechanism of Figure 6, the rack 42b, and accordingly its platen, moves upwardly; the mirror rack 44b moves toward the platen 30b one-half the amount of the movement of the rack 42b, all according to the lens equation.

In any of these variations, as in Figures 1-5, there is selectivity as to which elements will be held and which will move and this selectivity is preferably variable over the range of operation to enable first one and then another and then even another element to serve as the fixed element, thereby creating in any of these systems a factor of flexibility to the end that operation will be free and easy and without binding as extremes are approached.

Various other features, not categorically enumerated, will occur to those versed in the art, as will modifications and alterations in the preferred inventive embodiments disclosed, all of which may be achieved without departing from the spirit and scope of the invention.

What is claimed is:

1. Autofocus apparatus, comprising: support means; an image platen and an object platen carried by the support means for movement relative to each other; a lens intermediate the platens; and inversor mechanism interrelating the platens and lens for maintaining proper focus, including first and second carriers mounted on the support means for movement of one relative to the other along a straight line of action parallel to the light path through the lens, a first pinion fixed to the first carrier, a second pinion journaled on the second carrier on an axis parallel to that of the first pinion, said pinions having equal pitch diameters, a first rack bar meshing with the pinions for rotating the second pinion upon relative movement of the carriers, a third pinion coaxial with and driven by the second pinion, second and third rack bars connected respectively to the platens and meshing with the third pinion, and means connecting the lens to the first carrier for effecting positioning of the lens according to the position of said first carrier when said carriers are moved relatively.

2. In an automatic focusing device to maintain the required relation between an image platen member, an object platen member, and a lens member, two of said members being movable relative to each other and relative to the third of said members, the improvement comprising first and second parallel relatively movable rack bars adapted to be connected respectively to the platen members, a rotatable pinion set including a journaling carrier and first and second coaxial pinions, the first of said pinions being disposed between the rack bars and meshing therewith, a third, non-rotatable pinion having a pitch diameter equal to that of the second pinion of the pinion set, means connecting the non-rotatable pinion to the lens member, and a third rack bar meshing with the non-rotatable pinion and with the second pinion of said pinion set.

3. The invention defined in claim 2, including: a fourth rack bar connected to the pinion set journaling carrier, and means including a fourth rotatable pinion coaxial with the non-rotatable pinion and meshing with the fourth rack bar, and a fifth rack bar connected to the lens carrier member and meshing with said fourth pinion, said fifth rack bar and fourth pinion serving as the aforesaid means connecting the lens carrier member to the non-rotatable pinion and operative to move the lens carrier relative to the non-rotatable pinion.

4. In an automatic focusing device to maintain the required relation between an image platen member, an object platen member and an image-forming optical member, two of said members being movable relative to each other and relative to the third of said members, the improvement comprising non-rotatable pinion means; rotatable pinion means; means mounting one pinion means for movement relative to the other along a straight-line path; means connecting the optical member to the non-rotatable pinion means so that the relative positions of the optical member and the rotatable pinion means are changed in response to said straight-line movement of one pinion means relative to the other; a first rack bar meshing with both pinion means for effecting rotation of the rotatable means in response to said straight-line relative movement; and driven means connected to the platens and driven by rotation of the rotatable pinion means for coordinating the relative positions of the optical member and platen members.

5. The invention defined in claim 4, in which: said driven means includes second and third parallel rack bars connected respectively to the platen members and meshing with diametrically opposite sides of the rotatable pinion means for movement in unison but in opposite directions along respective paths parallel to the aforesaid straight-line path.

6. The invention defined in claim 4, in which: said driven means includes a second rack bar connected to one platen member and meshing with the rotatable pinion means for movement along a path parallel to the aforesaid straight-line path, a third rack bar meshing with the rotatable means for movement along a path angled to said straight-line path and at a rate different from the rate of movement of the second rack bar, a mirror in the light path for deflecting the light path, and at least one mirror on and movable with the third rack for redeflecting the light path to the other platen member and compensating for the aforesaid difference in rates of movement of said second and third rack bars.

References Cited in the file of this patent

FOREIGN PATENTS 702,308     Germany              Feb. 4, 1941

UNITED STATES PATENT OFFICE

CERTIFICATE OF CORRECTION

Patent No. 2,823,580                          February 18, 1958

Wright K. Gannett

It is hereby certified that error appears in the above numbered patent requiring correction and that the said Letters Patent should read as corrected below.

In the grant, lines 1, 2 and 3, for "Wright K. Gannett, of near Davenport, Iowa," read -- Wright K. Gannett, of near Davenport, Iowa, assignor to Mast Development Co., of Davenport, Iowa, a corporation of Iowa, --; line 12, for "Wright K. Gannett, his heirs" read -- Mast Development Co., its successors --; In the heading to the printed specification, line 3, for "Wright K. Gannett, near Davenport, Iowa" read -- Wright K. Gannett, near Davenport, Iowa, assignor to Mast Development Co., Davenport, Iowa, a corporation of Iowa --.

Signed and sealed this 22nd day of April 1958.

(SEAL)

Attest:

KARL H. AXLINE
Attesting Officer

ROBERT C. WATSON
Commissioner of Patents